US012662158B2

(12) United States Patent
Seo

(10) Patent No.: US 12,662,158 B2
(45) Date of Patent: Jun. 23, 2026

(54) VEHICLE CONTROL APPARATUS AND METHOD THEREOF

(71) Applicants: Hyundai Motor Company, Seoul (KR); Kia Corporation, Seoul (KR)

(72) Inventor: Ho Tae Seo, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 21 days.

(21) Appl. No.: 18/966,451

(22) Filed: Dec. 3, 2024

(65) Prior Publication Data

US 2026/0021825 A1 Jan. 22, 2026

(30) Foreign Application Priority Data

Jul. 17, 2024 (KR) ......................... 10-2024-0094485

(51) Int. Cl.
B60W 60/00 (2020.01)
G06N 3/08 (2023.01)

(52) U.S. Cl.
CPC ............. B60W 60/001 (2020.02); G06N 3/08 (2013.01); B60W 2420/408 (2024.01); B60W 2520/06 (2013.01)

(58) Field of Classification Search
CPC ......... B60W 60/001; B60W 2420/408; B60W 2520/06; G06N 3/08
See application file for complete search history.

(56) References Cited

U.S. PATENT DOCUMENTS

| | | | |
|---|---|---|---|
| 11,878,682 B2 * | 1/2024 | Lee | B60W 30/18163 |
| 2022/0297701 A1 * | 9/2022 | Heo | B60W 40/09 |

OTHER PUBLICATIONS

Lang, A. H., Vora, S., Caesar, H., Zhou, L., Yang, J., & Beijbom, O. (2019). Pointpillars: Fast encoders for object detection from point clouds. In Proceedings of the IEEE/CVF conference on computer vision and pattern recognition (pp. 12697-12705).

* cited by examiner

*Primary Examiner* — Aryan E Weisenfeld
(74) *Attorney, Agent, or Firm* — Banner & Witcoff, Ltd.

(57) ABSTRACT

An apparatus for controlling vehicle driving comprises a sensor to obtain a cluster of points, a memory storing a neural network model, and a processor. The processor is configured to determine a first heading direction of a virtual box, generated from the cluster of points, by inputting the cluster into the neural network model. Based on identifying the first heading direction in one of several regions, the apparatus determines an angle between a reference axis within that region and the first heading direction. The regions are divided based on the virtual box's center. Based on this angle, the apparatus outputs the virtual box assigned with the first heading direction or a second heading direction opposite to the first heading direction. The apparatus outputs a signal associated with the virtual box's heading direction and controls vehicle driving based on this signal.

20 Claims, 6 Drawing Sheets

VEHICLE CONTROL
APPARATUS 100

PROCESSOR 110

LIDAR 120

MEMORY 130

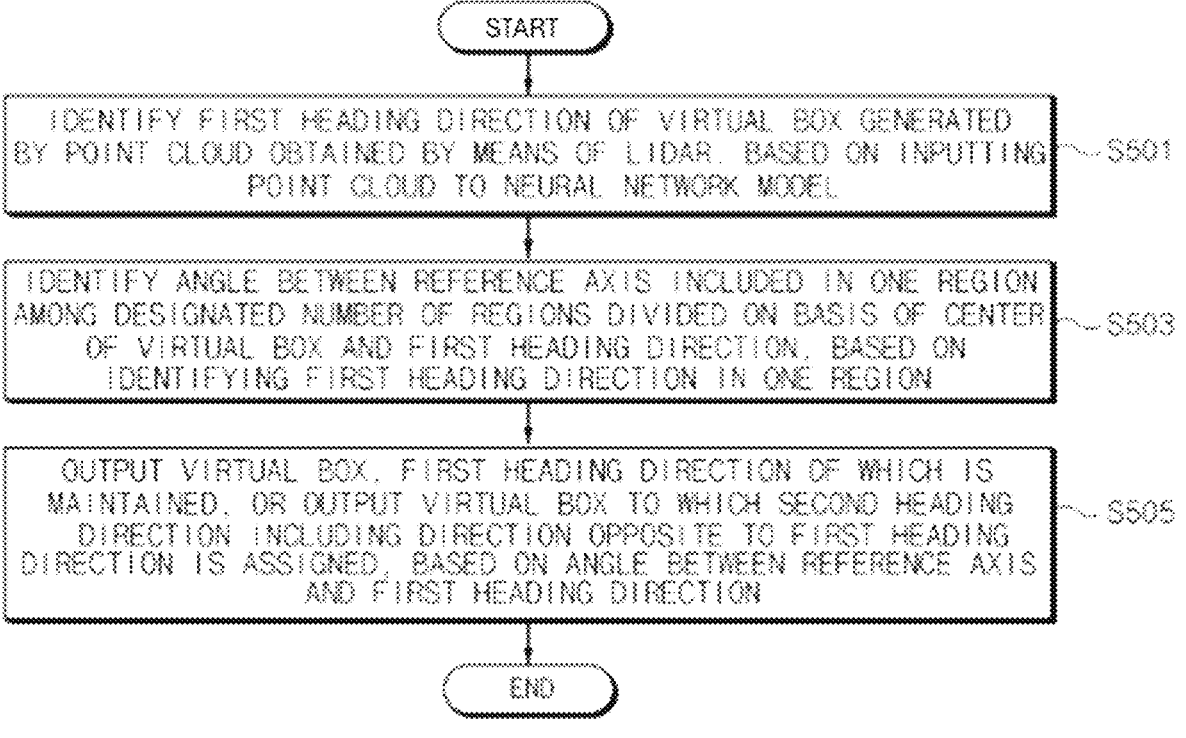

START

IDENTIFY FIRST HEADING DIRECTION OF VIRTUAL BOX GENERATED
BY POINT CLOUD OBTAINED BY MEANS OF LIDAR, BASED ON INPUTTING ~S501
POINT CLOUD TO NEURAL NETWORK MODEL

IDENTIFY ANGLE BETWEEN REFERENCE AXIS INCLUDED IN ONE REGION
AMONG DESIGNATED NUMBER OF REGIONS DIVIDED ON BASIS OF CENTER ~S503
OF VIRTUAL BOX AND FIRST HEADING DIRECTION, BASED ON
IDENTIFYING FIRST HEADING DIRECTION IN ONE REGION

OUTPUT VIRTUAL BOX, FIRST HEADING DIRECTION OF WHICH IS
MAINTAINED, OR OUTPUT VIRTUAL BOX TO WHICH SECOND HEADING ~S505
DIRECTION INCLUDING DIRECTION OPPOSITE TO FIRST HEADING
DIRECTION IS ASSIGNED, BASED ON ANGLE BETWEEN REFERENCE AXIS
AND FIRST HEADING DIRECTION

END

FIG.5

VEHICLE CONTROL APPARATUS AND METHOD THEREOF

CROSS-REFERENCE TO RELATED APPLICATION

This application claims the benefit of priority to Korean Patent Application No. 10-2024-0094485, filed in the Korean Intellectual Property Office on Jul. 17, 2024, the entire contents of which are incorporated herein by reference.

TECHNICAL FIELD

The present disclosure relates to a vehicle control apparatus and a method thereof, and more particularly, relates to technologies using a sensor (e.g., light detection and ranging (LiDAR)).

BACKGROUND

The matters described in this Background section are only for the enhancement of understanding of the background of the disclosure, and should not be taken as acknowledgment that they correspond to prior art already known to those skilled in the art.

Various studies for identifying an external object using various sensors are considered to assist with driving of a host vehicle.

Particularly, while the host vehicle is operating in a driving assist mode or an autonomous driving mode, an environment around the host vehicle may be identified using LiDAR.

Various studies are considered to identify a heading direction of an external object included in the environment around the host vehicle. A driving route of the host vehicle may be set and the speed of the host vehicle may be controlled, according to the heading direction of the external object. There is a need to accurately determine the heading direction of the external object and use the heading direction to assist with driving of the host vehicle.

SUMMARY

According to the present disclosure, an apparatus for controlling driving of a vehicle, the apparatus may comprise, a sensor configured to obtain a cluster of points, a memory storing a neural network model, and a processor configured to, determine, based on inputting the cluster of points to the neural network model, a first heading direction of a virtual box, wherein the virtual box is generated based on the cluster of points, determine, based on identifying the first heading direction in one region among a designated number of regions, an angle between a reference axis and the first heading direction, wherein the reference axis is included in the one region, and wherein the designated number of regions are divided based on a center of the virtual box, based on the determined angle, output the virtual box assigned with the first heading direction, wherein the first heading direction is maintained, or output the virtual box assigned with a second heading direction that is opposite to the first heading direction, and output a signal associated with, the virtual box assigned with the first heading direction, or the virtual box assigned with the second heading direction, and control, based on the signal, driving of the vehicle.

The apparatus, wherein the processor is configured to, determine, based on assigning an index to each of the designated number of regions, a region index of the one region.

The apparatus, wherein the processor is configured to, output, based on the determined angle being less than a threshold angle, the virtual box assigned with the first heading direction.

The apparatus, wherein the processor is configured to, output, based on the determined angle being greater than or equal to a threshold angle, the virtual box assigned with the second heading direction.

The apparatus, wherein the processor is configured to, output, based on the determined angle and a position of the virtual box, the virtual box assigned with the first heading direction or the virtual box assigned with the second heading direction.

The apparatus, wherein the processor is configured to, train, based on a ground-truth (GT) bounding box and the cluster of points, the neural network model.

The apparatus, wherein the processor is configured to, train, based on information associated with the virtual box, the neural network model, and wherein the information associated with the virtual box may comprise at least one of, a position of the virtual box, a size of the virtual box, the first heading direction, class information of the virtual box, or score information of the virtual box.

The apparatus, wherein the processor is configured to, set a number of anchor boxes among result values output from the neural network model to a designated number to train the neural network model.

The apparatus, wherein the processor is configured to, obtain, based on training the neural network model, a loss value for at least one of the class information or the position.

The apparatus, wherein the processor is configured to, sequentially execute, based on performing pre-processing for the cluster of points, a first algorithm and a second algorithm, and train, based on a result value obtained by sequentially executing the first algorithm and the second algorithm, the neural network model.

According to the present disclosure, a method performed by an apparatus for controlling driving of a vehicle, the method may comprise, determining, based on inputting a cluster of points to a neural network model, a first heading direction of a virtual box, wherein the virtual box is generated based on the cluster of points, and wherein the cluster of points are obtained by a sensor, determining, based on identifying the first heading direction in one region among a designated number of regions, an angle between a reference axis and the first heading direction, wherein the reference axis is included in the one region, and wherein the designated number of regions are divided based on a center of the virtual box, based on the determined angle, outputting the virtual box assigned with the first heading direction, wherein the first heading direction is maintained, or outputting the virtual box assigned with a second heading direction that is opposite to the first heading direction, outputting a signal associated with, the virtual box assigned with the first heading direction, or the virtual box assigned with the second heading direction, and controlling, based on the signal, driving of the vehicle.

The method may further comprise, determining, based on assigning an index to each of the designated number of regions, a region index of the one region.

The method, wherein the outputting the virtual box may comprise outputting, based on the determined angle being less than a threshold angle, the virtual box assigned with the first heading direction.

The method, wherein the outputting the virtual box may comprise outputting, based on the determined angle being greater than or equal to a threshold angle, the virtual box assigned with the second heading direction.

The method, wherein the outputting the virtual box may comprise outputting, based on the determined angle and a position of the virtual box, the virtual box assigned with the first heading direction or the virtual box assigned with the second heading direction.

The method may further comprise, training, based on a ground-truth (GT) bounding box and the cluster of points, the neural network model.

The method may further comprise, training, based on information associated with the virtual box, the neural network model, wherein the information associated with the virtual box may comprise at least one of, a position of the virtual box, a size of the virtual box, the first heading direction, class information of the virtual box, or score information of the virtual box.

The method may further comprise, setting a number of anchor boxes among result values output from the neural network model to a designated number to train the neural network model.

The method may further comprise, obtaining, based on training the neural network model, a loss value for at least one of the class information or the position.

The method may further comprise, sequentially executing, based on performing pre-processing for the cluster of points, a first algorithm and a second algorithm, and training, based on a result value obtained by sequentially executing the first algorithm and the second algorithm, the neural network model.

BRIEF DESCRIPTION OF THE DRAWINGS

The above and other objects, features and advantages of the present disclosure will be more apparent from the following detailed description taken in conjunction with the accompanying drawings:

FIG. 5 shows an example of a flowchart associated with a vehicle control method according to an example of the present disclosure.

DETAILED DESCRIPTION

Figure 1:
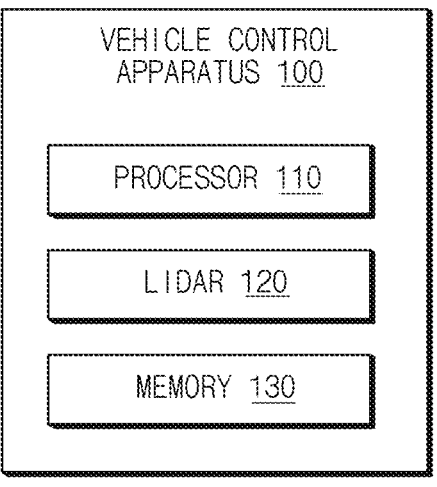
FIG. 1 shows an example of a block diagram associated with a vehicle control apparatus according to an example of the present disclosure.

Hereinafter, some examples of the present disclosure will be described in detail with reference to the exemplary drawings. In adding the reference numerals to the components of each drawing, it should be noted that the identical component is designated by the identical numerals even when they are displayed on other drawings. In addition, a detailed description of well-known features or functions will be ruled out in order not to unnecessarily obscure the gist of the present disclosure.

In describing components of examples of the present disclosure, the terms first, second, A, B, (a), (b), and the like may be used herein. These terms are only used to distinguish one component from another component, but do not limit the corresponding components irrespective of the order or priority of the corresponding components. Furthermore, unless otherwise defined, all terms including technical and scientific terms used herein have the same meaning as being generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

For purposes of this application and the claims, using the exemplary phrase "at least one of: A; B; or C" or "at least one of A, B, or C," the phrase means "at least one A, or at least one B, or at least one C, or any combination of at least one A, at least one B, and at least one C. Further, exemplary phrases, such as "A, B, and C", "A, B, or C", "at least one of A, B, and C", "at least one of A, B, or C", etc. as used herein may mean each listed item or all possible combinations of the listed items. For example, "at least one of A or B" may refer to (1) at least one A; (2) at least one B; or (3) at least one A and at least one B.

Hereinafter, examples of the present disclosure will be described in detail with reference to FIG. 1, FIG. 2, FIG. 3, FIG. 4, FIG. 5, and FIG. 6.

FIG. 1 shows an example of a block diagram associated with a vehicle control apparatus according to an example of the present disclosure.

Referring to FIG. 1, a vehicle control apparatus 100 according to an example of the present disclosure may be implemented inside or outside a vehicle, and some of the components included in the vehicle control apparatus 100 may be implemented inside or outside the vehicle. In this case, the vehicle control apparatus 100 may be integrally configured with control units in the vehicle or may be implemented as a separate device to be connected with the control units of the vehicle by a separate connection means. For example, the vehicle control apparatus 100 may further include components which are not shown in FIG. 1.

The vehicle control apparatus 100 according to an example may include a processor 110, light detection and ranging (LiDAR) 120, and a memory 130. The processor 110, the LiDAR 120, and the memory 130 may be electronically or operably coupled with each other by an electronical component including a communication bus.

Hereinafter, that pieces of hardware are operably coupled with each other may include that a direct connection or an indirect connection between the pieces of hardware is established in a wired or wireless manner, such that second hardware is controlled by first hardware among the pieces of hardware.

The different blocks are shown, but an example is not limited thereto. Some of the pieces of hardware of FIG. 1 may be included in a single integrated circuit including a system on a chip (SoC). Types of the pieces of hardware included in the vehicle control apparatus 100 and/or the number of the pieces of hardware are/is not limited to those shown in FIG. 1. For example, the vehicle control apparatus 100 may include only some of the pieces of hardware shown in FIG. 1.

The vehicle control apparatus 100 according to an example may include hardware for processing data based on one or more instructions. The hardware for processing the data may include the processor 110. For example, the hardware for processing the data may include an arithmetic and logic unit (ALU), a floating point unit (FPU), a field programmable gate array (FPGA), a central processing unit (CPU), and/or an application processor (AP). For example, the processor 110 may have a structure of a single-core processor or may have a structure of a multi-core processor including a dual core, a quad core, a hexa core, or an octa core.

In an example, the LiDAR 120 of the vehicle control apparatus 100 may obtain datasets for identifying a surrounding thing around the vehicle control apparatus 100 (or a host vehicle including the vehicle control apparatus 100). For example, the LiDAR 120 may identify at least one of a position of the surrounding thing, a motion direction of the surrounding thing, or a speed of the surrounding thing, or any combination thereof, based on that a pulse laser signal radiated from the LIDAR 120 is reflected from the surrounding thing to return.

For example, the LiDAR 120 may obtain datasets for representing the surrounding thing on a space formed by an x-axis, a y-axis, and a z-axis, based on the pulse laser signal reflected from the surrounding thing. For example, the LiDAR 120 may obtain datasets including a plurality of points in the space formed by the x-axis, the y-axis, and the z-axis, based on receiving the pulse laser signal at a specified period.

For example, the processor 110 may generate a point cloud, based on the plurality of points obtained by the LiDAR 120. For example, the point cloud may correspond to the external object (or the surrounding thing). For example, a point cloud may comprise a collection of data points in a three-dimensional coordinate system, representing the external surface of an object or environment. Each point in the cloud may have its own set of X, Y, and Z coordinates, and/or additional information (e.g., color or intensity). Point clouds may be generated by 3D scanners, LiDAR, or photogrammetry techniques, and may be used in various applications such as 3D modeling, computer vision, and/or robotics, etc. They may provide a highly detailed and/or accurate representation of complex surfaces and/or structures, making them ideal for tasks like object recognition, environment mapping, and/or digital reconstruction, etc.

The memory 130 of the vehicle control apparatus 100 according to an example may include a hardware component for storing data and/or an instruction input and/or output from the processor 110 of the vehicle control apparatus 100.

For example, the memory 130 may include a volatile memory including a random-access memory (RAM) and/or a non-volatile memory including a read-only memory (ROM).

For example, the volatile memory may include at least one of a dynamic RAM (DRAM), a static RAM (SRAM), a cache RAM, or a pseudo SRAM (PSRAM), or any combination thereof.

For example, the non-volatile memory may include at least one of a programmable ROM (PROM), an erasable PROM (EPROM), an electrically erasable PROM (EE-PROM), a flash memory, a hard disk, a compact disc, a solid state drive (SSD), or an embedded multi-media card (eMMC), or any combination thereof.

For example, the memory 130 may store a neural network model. For example, the neural network model may include a deep learning model. For example, the deep learning model may include at least one of a deep neural network (DNN), a convolutional neural network (CNN), a recurrent neural network (RNN), a restricted Boltzmann machine (RBM), a deep belief network (DBN), deep Q-networks, or a region proposal network (RPN), or any combination thereof.

The processor 110 of the vehicle control apparatus 100 according to example may obtain a point cloud by the LiDAR 120. For example, the processor 110 may input the point cloud obtained by the LiDAR 120 to the neural network model. For example, the processor 110 may identify a first heading direction of a virtual box generated by the point cloud obtained by the LiDAR 120, based on inputting the point cloud to the neural network model. Virtual boxes may refer to bounding boxes or virtual representations that are used to define the approximate space occupied by external objects detected by the vehicle's sensors (such as cameras, LiDAR, or radar). These virtual boxes may be aligned with a 3D coordinate system (e.g., x, y, and z axes) and may be projected around objects in the environment, such as pedestrians, other vehicles, cyclists, or obstacles, to help an autonomous system understand their positions, sizes, and movement. The autonomous system may use these boxes to track the movement of objects over time, allowing it to predict their future trajectories. This tracking capability may be applied for collision avoidance, as the system may determine distances and evaluate potential risks of collisions, enabling it to take actions like braking or steering to avoid obstacles. Further, virtual boxes may provide useful spatial information for path planning, helping the vehicle adjust its route to maintain safe distances from surrounding objects and navigate through complex environments. The virtual boxes may provide a simplified geometric representation of real-world objects, allowing the autonomous driving system to process and respond to its surroundings efficiently.

An automation level of an autonomous driving vehicle may be classified as follows, according to the American Society of Automotive Engineers (SAE). At autonomous driving level 0, the SAE classification standard may correspond to "no automation," in which an autonomous driving system is temporarily involved in emergency situations (e.g., automatic emergency braking) and/or provides warnings only (e.g., blind spot warning, lane departure warning, etc.), and a driver is expected to operate the vehicle. At autonomous driving level 1, the SAE classification standard may correspond to "driver assistance," in which the system performs some driving functions (e.g., steering, acceleration, brake, lane centering, adaptive cruise control, etc.) while the driver operates the vehicle in a normal operation section, and the driver is expected to determine an operation state and/or timing of the system, perform other driving functions, and cope with (e.g., resolve) emergency situations. At autonomous driving level 2, the SAE classification standard may correspond to "partial automation," in which the system performs steering, acceleration, and/or braking under the supervision of the driver, and the driver is expected to determine an operation state and/or timing of the system, perform other driving functions, and cope with (e.g., resolve) emergency situations. At autonomous driving level 3, the SAE classification standard may correspond to "conditional automation," in which the system drives the vehicle (e.g., performs driving functions such as steering, accelera-
tion, and/or braking) under limited conditions but transfer
driving control to the driver when the required conditions
are not met, and the driver is expected to determine an
operation state and/or timing of the system, and take over
control in emergency situations but do not otherwise operate
the vehicle (e.g., steer, accelerate, and/or brake). At autono-
mous driving level 4, the SAE classification standard may
correspond to "high automation," in which the system
performs all driving functions, and the driver is expected to
take control of the vehicle only in emergency situations. At
autonomous driving level 5, the SAE classification standard
may correspond to "full automation," in which the system
performs full driving functions without any aid from the
driver including in emergency situations, and the driver is
not expected to perform any driving functions other than
determining the operating state of the system. Although the
present disclosure may apply the SAE classification standard
for autonomous driving classification, other classification
methods and/or algorithms may be used in one or more
configurations described herein.

One or more features associated with autonomous driving
control may be activated based on configured autonomous
driving control setting(s) (e.g., based on at least one of: an
autonomous driving classification, a selection of an autono-
mous driving level for a vehicle, etc.). Based on one or more
features (e.g., features of a virtual box assigned with a first
heading direction or a second heading direction) described
herein, an operation of the vehicle may be controlled. The
vehicle control may include various operational controls
associated with the vehicle (e.g., autonomous driving con-
trol, sensor control, braking control, time control, accelera-
tion control, acceleration change rate control, alarm timing
control, forward collision warning time control, etc.).

One or more auxiliary devices (e.g., engine brake, exhaust
brake, hydraulic retarder, electric retarder, regenerative
brake, etc.) may also be controlled, for example, based on
one or more features (e.g., features of a virtual box assigned
with a first heading direction or a second heading direction)
described herein.

One or more communication devices (e.g., a modem, a
network adapter, a radio transceiver, an antenna, etc., that is
capable of communicating via one or more wired or wireless
communication protocols, such as Ethernet, Wi-Fi, near-
field communication (NFC), Bluetooth, Long-Term Evolu-
tion (LTE), 5G New Radio (NR), vehicle-to-everything
(V2X), etc.) may also be controlled, for example, based on
one or more features (e.g., features of a virtual box assigned
with a first heading direction or a second heading direction)
described herein.

Minimum risk maneuver (MRM) operation(s) may also
be controlled, for example, based on one or more features
(e.g., features of a virtual box assigned with a first heading
direction or a second heading direction) described herein. A
minimal risk maneuvering operation (e.g., a minimal risk
maneuver, a minimum risk maneuver) may be a maneuver-
ing operation of a vehicle to minimize (e.g., reduce) a risk
of collision with surrounding vehicles in order to reach a
lowered (e.g., minimum) risk state. A minimal risk maneu-
ver may be an operation that may be activated during
autonomous driving of the vehicle when a driver is unable
to respond to a request to intervene. During the minimal risk
maneuver, one or more processors of the vehicle may control
a driving operation of the vehicle for a set period of time.

Biased driving operation(s) may also be controlled, for
example, based on one or more features (e.g., features of a
virtual box assigned with a first heading direction or a second heading direction) described herein. A driving con-
trol apparatus may perform a biased driving control. To
perform a biased driving, the driving control apparatus may
control the vehicle to drive in a lane by maintaining a lateral
distance between the position of the center of the vehicle and
the center of the lane. For example, the driving control
apparatus may control the vehicle to stay in the lane but not
in the center of the lane. The driving control apparatus may
identify or determine a biased target lateral distance for
biased driving control. For example, a biased target lateral
distance may comprise an intentionally adjusted lateral
distance that a vehicle may aim to maintain from a reference
point, such as the center of a lane or another vehicle, during
maneuvers such as lane changes. This adjustment may be
made to improve the vehicle's stability, safety, and/or per-
formance under varying driving conditions, etc. For
example, during a lane change, the driving control system
may bias the lateral distance to keep a safer gap from
adjacent vehicles, considering factors such as the vehicle's
speed, road conditions, and/or the presence of obstacles, etc.

One or more sensors (e.g., IMU sensors, camera, LIDAR,
RADAR, blind spot monitoring sensor, line departure warn-
ing sensor, parking sensor, light sensor, rain sensor, traction
control sensor, anti-lock braking system sensor, tire pressure
monitoring sensor, seatbelt sensor, airbag sensor, fuel sen-
sor, emission sensor, throttle position sensor, inverter, con-
verter, motor controller, power distribution unit, high-volt-
age wiring and connectors, auxiliary power modules,
charging interface, etc.) may also be controlled, for example,
based on one or more features (e.g., features of a virtual box
assigned with a first heading direction or a second heading
direction) described herein. An operation control for autono-
mous driving of the vehicle may include various driving
control of the vehicle by the vehicle control device (e.g.,
acceleration, deceleration, steering control, gear shifting
control, braking system control, traction control, stability
control, cruise control, lane keeping assist control, collision
avoidance system control, emergency brake assistance con-
trol, traffic sign recognition control, adaptive headlight con-
trol, etc.).

In an example, the processor 110 may identify the first
heading direction of the virtual box, in one region among a
designated number of regions divided on the basis of the
center of the virtual box. For example, the processor 110
may identify an angle between a reference axis included in
the one region and the first heading direction. For example,
the processor 110 may identify the angle between the
reference axis included in the one region among the desig-
nated number of regions divided on the basis of the center
of the virtual box and the first heading direction, based on
identifying the first heading direction of the virtual box, in
the one region.

For example, the designated number may be set by at least
one of a user or a vendor, or any combination thereof.

For example, the processor 110 may assign an index to
each of the designated number of regions. For example, the
processor 110 may assign a first index to a first region among
the designated number of regions. For example, the proces-
sor 110 may assign a second index to a second region among
the designated number of regions. For example, the proces-
sor 110 may assign a third index to a third region among the
designated number of regions. For example, the processor
110 may assign a fourth index to a fourth region among the
designated number of regions. As described above, the
processor 110 may assign the index to each of the designated
number of regions. For example, the processor 110 may
sequentially assign indexes to the designated number of regions, respectively, in a designated direction (e.g., a clockwise direction or a counterclockwise direction). It is described that the first to fourth indexes are assigned to the first to fourth regions, respectively, but an example is not limited thereto. For example, the designated number of regions may be four as described above, but are not limited thereto.

In an example, the processor 110 may identify the angle between the reference axis and the first heading direction. For example, the processor 110 may output a virtual box, the first heading direction of which is maintained, based on the angle between the reference axis and the first heading direction. For example, the processor 110 may output the virtual box to which a second heading direction including a direction opposite to the first heading direction is assigned, based on the angle between the reference axis and the first heading direction.

For example, the processor 110 may output the virtual box, the first heading direction of which is maintained, or may output the virtual box to which the second heading direction including the direction opposite to the first heading direction is assigned, based on the angle between the reference axis and the first heading direction.

For example, the processor 110 may identify whether the angle between the reference axis and the first heading direction is greater than or equal to a designated angle.

For example, the processor 110 may identify that the angle between the reference axis and the first heading direction is less than the designated angle. For example, the processor 110 output the virtual box, the first heading direction of which is maintained. For example, the processor 110 may output the virtual box, the first heading direction of which is maintained, based on that the angle between the reference axis and the first heading direction is less than the designated angle.

For example, the processor 110 may identify that the angle between the reference axis and the first heading direction is greater than or equal to the designated angle. For example, the processor 110 output the virtual box to which the second heading direction is assigned. For example, the processor 100 may output the virtual box to which the second heading direction is assigned, based on that the angle between the reference axis and the first heading direction is greater than or equal to the designated angle.

For example, the processor 110 may identify at least one of the angle between the reference axis and the first heading direction or a position of the virtual box, or any combination thereof. For example, the processor 110 may identify the angle between the reference axis and the first heading direction and the position of the virtual box. For example, the processor 100 may output the virtual box, the first heading direction of which is maintained, based on that the angle between the reference axis and the first heading direction and the position of the virtual box. For example, the processor 110 may output the virtual box to which the second heading direction is assigned, based on that the angle between the reference axis and the first heading direction and the position of the virtual box. For example, the processor 110 may output the virtual box, the first heading direction of which is maintained, or may output the virtual box to which the second heading direction is assigned, based on the angle between the reference axis and the first heading direction and the position of the virtual box.

In an example, the processor 110 may train the neural network model. For example, the processor 110 may train the neural network model, based on at least one of a ground-truth (GT) bounding box or the point cloud, or any combination thereof. For example, the processor 110 may train the neural network model, based on the GT bounding box and the point cloud. For example, the GT bounding box may be associated with a ground truth parameter comprising a reference value or set of values that may represent the correct or actual state of something in a machine learning model. Ground truth parameters may be used to train models by providing accurate, labeled data that the model may learn from.

For example, the processor 100 may train the neural network model, based on information associated with the virtual box. For example, the information associated with the virtual box may include at least one of the position of the virtual box, a size of the virtual box, the first heading direction of the virtual box, class information of the virtual box, or score information of the virtual box, or any combination thereof.

For example, the position of the virtual box may correspond to a coordinate value corresponding to the center of the virtual box on a three-dimensional (3D) virtual coordinate system. For example, the 3D virtual coordinate system may include an x-axis, a y-axis, and a z-axis. For example, the 3D virtual coordinate system may include at least one of a LiDAR coordinate system or a vehicle coordinate system, or any combination thereof. However, an example of the present disclosure is not limited to those described above.

For example, the size of the virtual box may include at least one of a width of the virtual box, a length of the virtual box, or a height of the virtual box, or any combination thereof. For example, the size of the virtual box may include the width of the virtual box, the length of the virtual box, and the height of the virtual box.

For example, the first heading direction of the virtual box may include a direction the virtual box faces, if the virtual box is generated.

For example, the class information of the virtual box may include a type of an external object corresponding to the virtual box, a category of the external object, or a class of the external object, or any combination thereof.

For example, the score information of the virtual box may include information indicating reliability of the virtual box.

For example, the processor 110 may obtain a result value output from the neural network model. For example, the processor 110 may set the number of anchor boxes among result values output from the neural network model to a designated number. For example, the processor 110 may set the number of anchor boxes among the result values output from the neural network model to the designated number to train the neural network model.

For example, the result values output from the neural network model may be represented as (B, H, W, C). For example, B may refer to a batch size. For example, H may refer to a height size of a feature map. For example, W may refer to a width size of the feature map. For example, C may refer to the number of anchor boxes.

For example, the processor 110 may obtain a loss (e.g., a value associated with a loss function) for at least one of the class information of the virtual box or the position of the virtual box, or any combination thereof, based on training the neural network model. A loss function (e.g., a cost function or error function) is a method of evaluating how well a specific algorithm models the given data. By comparing the predicted values generated by the model to the actual target values, the loss function quantifies the error or difference. The purpose of the loss function is to guide the training process. When the model makes a prediction, the loss function computes a numerical value representing how far the prediction is from the true value. The goal of the learning algorithm is to minimize this loss value by adjusting the model's parameters during the training phase.

For example, the processor 110 may obtain the loss, based on a designated function. For example, the processor 110 may obtain the loss for the class information of the virtual box, based on a first function. For example, the processor 110 may obtain the loss for the position of the virtual box, based on a second function.

For example, the first function may include a cross entropy loss. For example, the second function may include a smooth L1 loss. However, an example of the present disclosure is not limited to those described above.

For example, the processor 110 may perform pre-processing for the point cloud. The processor 110 may sequentially execute a first algorithm and a second algorithm. For example, the processor 110 may sequentially execute the first algorithm and the second algorithm, based on performing the pre-processing for the point cloud. For example, the processor 110 may train the neural network model, using a result value obtained by sequentially executing the first algorithm and the second algorithm.

For example, the first algorithm may include a pillar feature extractor (PFE). For example, the second algorithm may include a scatter (SCT).

As described above, the vehicle control apparatus 100 according to example may train the neural network model. The vehicle control apparatus 100 may identify the heading direction of the virtual box corresponding to the external object, using the trained neural network model. The vehicle control apparatus 100 may output the virtual box, the first heading direction of which is maintained, or may output the virtual box to which the second heading direction including the direction opposite to the first heading direction is assigned. The vehicle control apparatus 100 may output the virtual box, the first heading direction of which is maintained, or may output the virtual box to which the second heading direction including the direction opposite to the first heading direction is assigned, using the regions divided into four (or four or more), thus accurately determining the heading direction of the virtual box corresponding to the external object.

Figure 2:
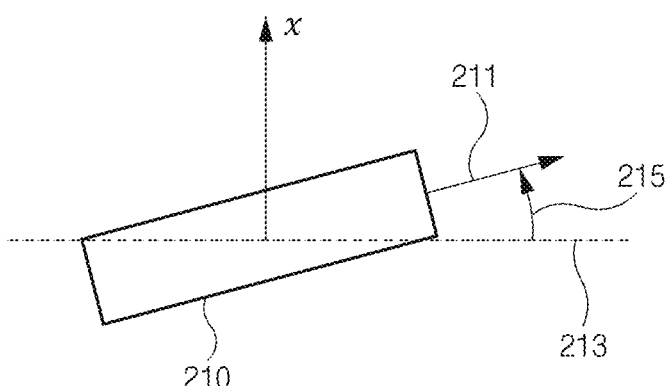
FIG. 2 shows an example of a heading direction of a virtual box, in an example of the present disclosure.

FIG. 2 shows an example of a heading direction of a virtual box, in an example of the present disclosure.

Referring to FIG. 2, a processor (e.g., a processor 110 of FIG. 1) of a vehicle control apparatus (e.g., a vehicle control apparatus 100 of FIG. 1) according to an example may obtain a plurality of points corresponding to an external object by a sensor (e.g., LiDAR 120 of FIG. 1). For example, the processor may generate a point cloud, based on the plurality of points obtained by the LiDAR.

For example, the processor may generate a virtual box 210, based on the point cloud.

In an example, the processor may identify a heading direction 211 of the virtual box 210. For example, the processor may identify an angle 215 between the heading direction 211 of the virtual box 210 and a reference axis 213.

For example, the processor may identify a region in which the heading direction 211 is located. The example of identifying the region in which the heading direction 211 is located will be described below in FIG. 3.

Figure 3:
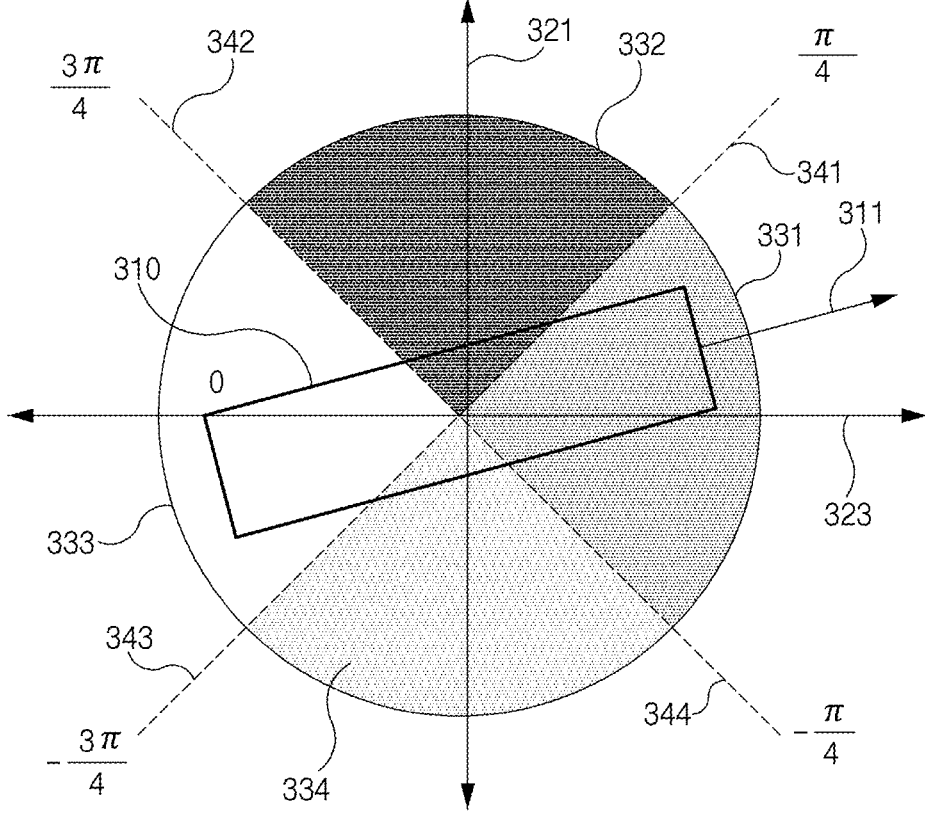
FIG. 3 shows an example of a designated number of regions, a reference axis, and a heading direction of a virtual box, in an example of the present disclosure.

FIG. 3 shows an example of a designated number of regions, a reference axis, and a heading direction of a virtual box, in an example of the present disclosure.

Referring to FIG. 3, a processor (e.g., a processor 110 of FIG. 1) of a vehicle control apparatus (e.g., a vehicle control apparatus 100 of FIG. 1) according to an example may generate a virtual box 310 corresponding to an external object, based on obtaining a point cloud.

For example, the processor may identify a heading direction 311 of the virtual box 310, based on generating the virtual box 310. For example, the processor may identify a region in which the heading direction 311 is located.

For example, the processor may obtain a plurality of regions 331, 332, 333, and 334, based on reference axes 321 and 323. For example, the processor may obtain the plurality of regions 331, 332, 333, and 334, based on obtaining the reference axes 321 and 323 on the basis of the center of the virtual box 310. For example, the reference axes 321 and 323 may include the center of the virtual box 310 and may be parallel to axes forming a vehicle coordinate system.

For example, the axes forming the vehicle coordinate system may include an x-axis, a y-axis, and a z-axis. For example, the x-axis may include an axis which increases toward the front of a host vehicle. For example, the y-axis may include an axis which increases toward the left of the host vehicle. For example, the z-axis may include an axis which increases toward the top of the host vehicle.

For example, the first reference axis 321 between the reference axes 321 and 323 may be parallel to the x-axis included in the vehicle coordinate system. For example, the second reference axis 323 between the reference axes 321 and 323 may be parallel to the y-axis included in the vehicle coordinate system.

In an example, the processor may obtain the plurality of regions 331, 332, 333, and 334. For example, the plurality of regions 331, 332, 333, and 334 may include regions obtained by dividing regions divided by the reference axes 321 and 323 using division axes 341, 342, 343, and 344. For example, the division axes 341, 342, 343, and 344 may include axes for dividing regions between the reference axes 321 and 323 in half.

For example, the processor may obtain the regions 331, 332, 333, and 334 between the division axes 341, 342, 343, and 344. For example, the processor may identify that the heading direction 311 is located in one of the regions 331, 332, 333, and 334.

The processor may determine whether to change the heading direction 311 of the virtual box 310, based on the region in which the heading direction 311 is located and the reference axes 321 and 323.

For example, the processor may identify whether an angle between the heading direction 311 and the reference axis 323 included in the region 331 including the heading direction 311 is greater than or equal to a designated angle (e.g., about 90 degrees).

For example, the processor may change the heading direction 311, based on that the angle between the heading direction 311 and the reference axis 323 included in the region 331 including the heading direction 311 is greater than or equal to the designated angle. For example, the processor may rotate the heading direction 311 at about 180 degrees, based on that the angle between the heading direction 311 and the reference axis 323 included in the region 331 including the heading direction 311 is greater than or equal to the designated angle.

As described above, the processor of the vehicle control apparatus according to example may output the virtual box 310, the heading direction 311 of which is maintained, or may output the virtual box 310, the heading direction 311 of which is changed, based on at least one of the regions 331, 332, 333, and 334, the reference axes 321 and 323, or a position of the heading direction 311, or any combination thereof.

Figure 4:
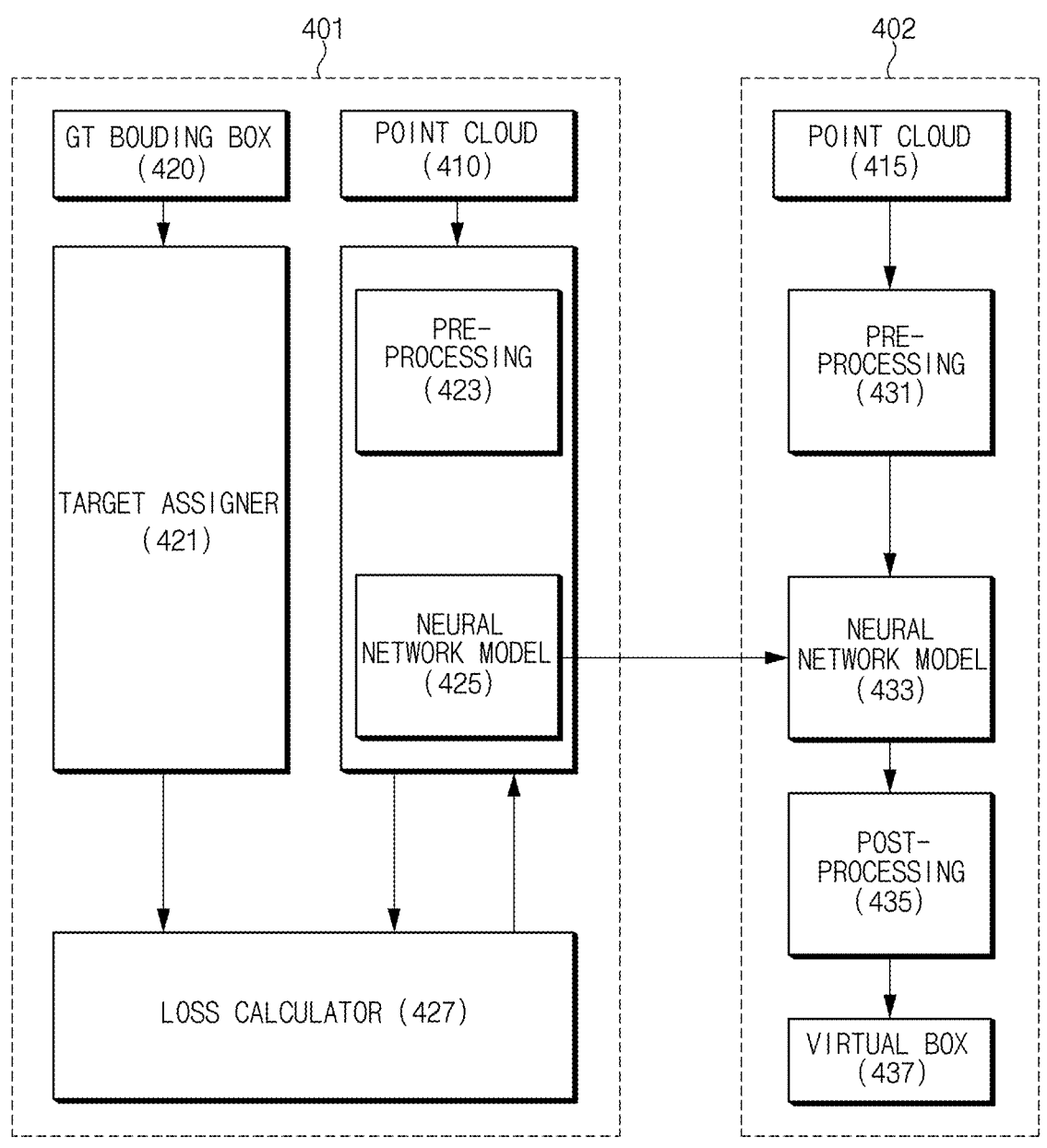
FIG. 4 shows an example of a block diagram about a process of generating a virtual box using a point cloud, in an example of the present disclosure.

FIG. 4 shows an example of a block diagram about a process of generating a virtual box using a point cloud, in an example of the present disclosure.

Referring to FIG. 4, a processor (e.g., a processor 110 of FIG. 1) of a vehicle control apparatus (e.g., a vehicle control apparatus 100 of FIG. 1) according to an example may obtain a point cloud 410 by LiDAR (e.g., LiDAR 120 of FIG. 1). For example, the processor may obtain a GT bounding box 420.

A first box 401 of FIG. 4 may include contents associated with training, and a second box 402 may include contents associated with inference.

In an example, the processor may train a neural network model 425, using at least one of the GT bounding box 420 or the point cloud 410, or any combination thereof.

For example, the processor may input the GT bounding box 420 to a target assigner 421. For example, the processor may obtain information associated with a target from the target assigner 421, based on inputting the GT bounding box 420 to the target assigner 421. For example, the processor may identify or determine vertices of the virtual box corresponding to an external object, based on at least one of the center of the virtual box, a size of the virtual box, or a heading direction of the virtual box, or any combination thereof, by using the information associated with the target, which is obtained from the target assigner 421.

In an example, the processor may perform pre-processing 423 for the point cloud 410. For example, the processor may input the result of performing the pre-processing 423 to the neural network model 425, based on performing the pre-processing 423 for the point cloud 410. For example, the processor may obtain an output value from the neural network model 425.

In an example, the processor may input at least one of the output value or the information associated with the target, or any combination thereof to a loss calculator 427. For example, the processor may input the output value and the information associated with the target to the loss calculator 427.

For example, the processor may obtain a loss from the loss calculator 427, based on inputting the output value and the information associated with the target to the loss calculator 427. For example, the processor may update a parameter of the neural network model 425, using the loss obtained from the loss calculator 427. For example, the processor may update the parameter of the neural network model 425, by a back propagation technique.

Hereinafter, a description will be given of an example of generating a virtual box 437 using a point cloud 415.

In an example, the processor may obtain the point cloud 415 by LiDAR. For example, the processor may perform pre-processing 431 for the point cloud 415.

In an example, the processor may input the pre-processed point cloud 415 to a neural network model 433. For example, the processor may output a virtual box, a heading direction of which is maintained, or may output a virtual box, a heading direction of which is changed, using the neural network model 433.

For example, the processor may obtain at least one of a box heading or a direction label, or any combination thereof from the neural network model 433. For example, the processor may obtain the box heading and the direction label from the neural network model 433.

For example, the processor may perform post-processing 435, based on obtaining the at least one of the box heading or the direction label, or the any combination thereof from the neural network model 433. For example, the processor may output the virtual box 437, the heading direction of which is determined, based on performing the post-processing 435.

According to an example, the processor may control a host vehicle, using the virtual box 437, the heading direction of which is determined. For example, the processor may set a driving route of the host vehicle or may control acceleration and/or deceleration of the host vehicle, using the virtual box 437, the heading direction of which is determined.

As described above, the vehicle control apparatus according to example may train the neural network model 425 or may determine the heading direction of the virtual box 437, using the trained neural network model 433.

FIG. 5 shows an example of a flowchart associated with a vehicle control method according to an example of the present disclosure. For convenience, FIG. 5 is described by way of an example in which the steps are performed by a processor (e.g., control circuitry). One, some, or all steps of FIG. 5, or portions thereof, may be performed by one or more other circuits. One or some, steps of FIG. 5 may be omitted, performed in other orders, and/or otherwise modified, and/or one or more additional steps may be added.

Hereinafter, it is assumed that a vehicle control apparatus 100 of FIG. 1 performs a process of FIG. 5. Furthermore, in a description of FIG. 5, an operation described as being performed by an apparatus may be understood as being controlled by a processor 110 of the vehicle control apparatus 100.

At least one of the operations of FIG. 5 may be performed by the vehicle control apparatus 100 of FIG. 1. At least one of the operations of FIG. 5 may be controlled by the processor 110 of FIG. 1. The respective operations of FIG. 5 may be sequentially performed, but are not necessarily sequentially performed. For example, an order of the respective operations may be changed, and at least two operations may be performed in parallel.

Referring to FIG. 5, in S501, the vehicle control method according to example may include identifying or determining a first heading direction of a virtual box generated by a point cloud obtained by LiDAR, based on inputting the point cloud to a neural network model.

For example, the vehicle control method may include training the neural network model, based on a GT bounding box and the point cloud.

For example, the vehicle control method may include training the neural network model, based on information associated with the virtual box. For example, the information associated with the virtual box may include at least one of a position of the virtual box, a size of the virtual box, a first heading direction of the virtual box, class information of the virtual box, or score information of the virtual box, or any combination thereof.

For example, the vehicle control method may include setting the number of anchor boxes among result values output from the neural network model to a designated number to train the neural network model.

For example, the vehicle control method may include obtaining a loss for at least one of the class information of the virtual box or the position of the virtual box, or any combination thereof, based on training the neural network model.

For example, the vehicle control method may include sequentially executing a first algorithm and a second algorithm, based on performing pre-processing for the point cloud and training the neural network model, using a result value obtained by sequentially executing the first algorithm and the second algorithm.

In S503, the vehicle control method according to example may include identifying an angle between a reference axis included in one region among a designated number of regions divided on the basis of the center of the virtual box and the first heading direction, based on identifying the first heading direction in the one region.

For example, the vehicle control method may include identifying a region index of the one region in which the first heading direction is identified, based on assigning an index to each of the designated number of regions.

In S505, the vehicle control method according to example may include outputting the virtual box, the first heading direction of which is maintained, or outputting the virtual box to which a second heading direction including a direction opposite to the first heading direction is assigned, based on the angle between the reference axis and the first heading direction.

For example, the vehicle control method may include outputting the virtual box, the first heading direction of which is maintained, based on that the angle between the reference axis and the first heading direction is less than a designated angle.

For example, the vehicle control method may include outputting the virtual box to which the second heading direction is assigned, based on that the angle between the reference axis and the first heading direction is greater than or equal to the designated angle.

For example, the vehicle control method may include outputting the virtual box, the first heading direction of which is maintained, or outputting the virtual box to which the second heading direction is assigned, based on the angle between the reference axis and the first heading direction and the position of the virtual box.

The vehicle control method according to example may include controlling a host vehicle, using at least one of the virtual box, the first heading direction of which is maintained, or the virtual box to which the second heading direction is assigned, or any combination thereof.

For example, the controlling of the host vehicle may include performing processes for setting a driving route of the host vehicle and moving the host vehicle along the driving route.

Figure 6:
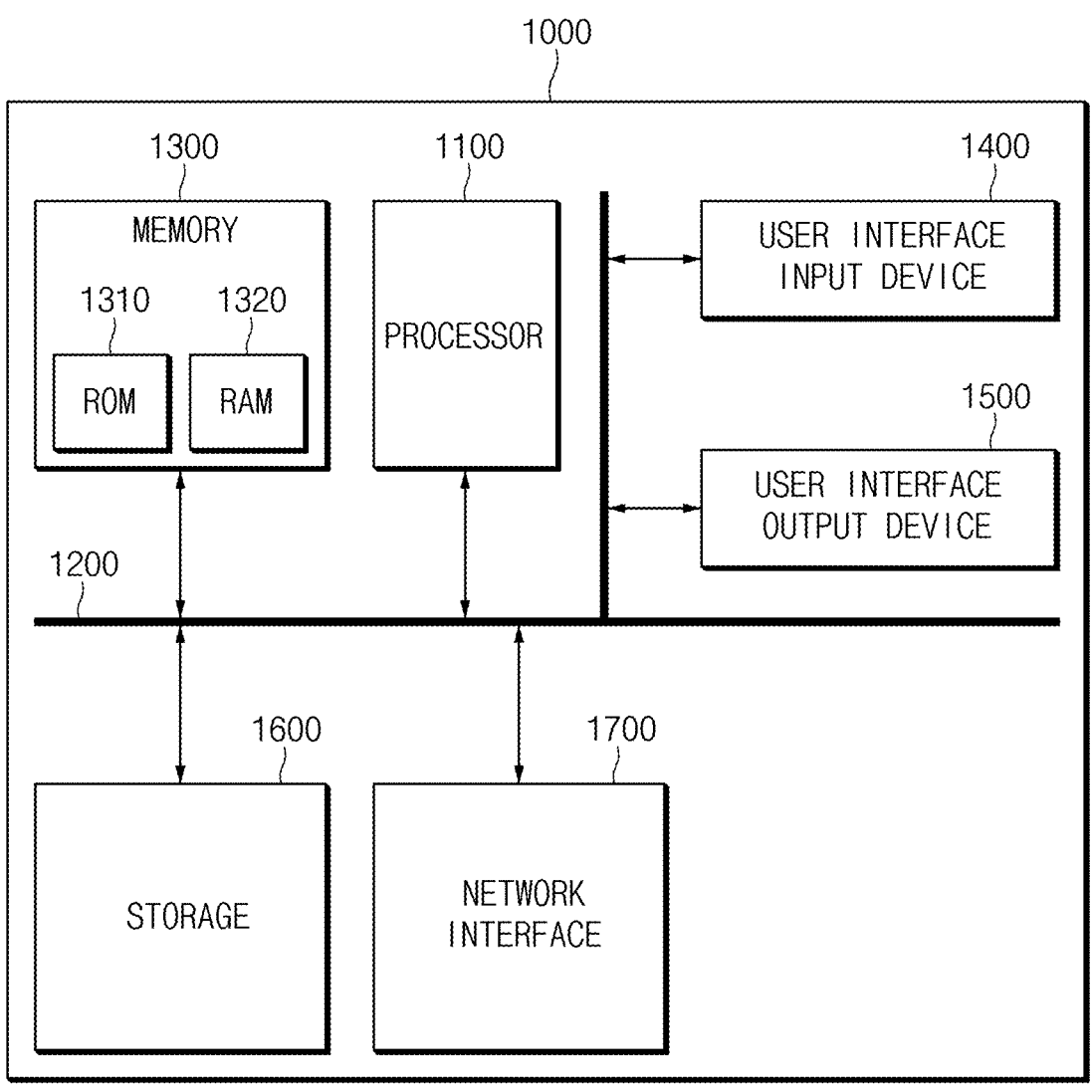
FIG. 6 shows an example of a computing system associated with a vehicle control apparatus or a vehicle control method according to an example of the present disclosure.

FIG. 6 shows an example of a computing system associated with a vehicle control apparatus or a vehicle control method according to an example of the present disclosure.

Referring to FIG. 6, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the examples disclosed in the specification may be directly implemented with a hardware module, a software module, or a combination of the hardware module and the software module, which is executed by the processor 1100. The software module may reside on a storage medium (e.g., the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present disclosure has been made to solve the above-mentioned problems occurring in the prior art while advantages achieved by the prior art are maintained intact.

An example of the present disclosure provides a vehicle control apparatus for identifying a heading direction of a virtual box corresponding to an external object and a method thereof.

Another example of the present disclosure provides a vehicle control apparatus for maintaining and outputting a heading direction of a virtual box generated by a point cloud or changing and outputting the heading direction of the virtual box and a method thereof.

Another example of the present disclosure provides a vehicle control apparatus for dividing a plurality of regions around a virtual box to output the virtual box, the heading direction of which is maintained, or output the virtual box, the heading direction of which is changed, and a method thereof.

The technical problems to be solved by the present disclosure are not limited to the aforementioned problems, and any other technical problems not mentioned herein will be clearly understood from the following description by those skilled in the art to which the present disclosure pertains.

According to an example of the present disclosure, a vehicle control apparatus may include light detection and ranging (LiDAR), a memory storing a neural network model, and a processor. The processor may identify a first heading direction of a virtual box generated by a point cloud obtained by the LiDAR, based on inputting the point cloud to the neural network model, may identify an angle between a reference axis included in one region among a designated number of regions divided on the basis of the center of the virtual box and the first heading direction, based on identifying the first heading direction in the one region, and may output the virtual box, the first heading direction of which is maintained, or may output the virtual box to which a second heading direction including a direction opposite to the first heading direction is assigned, based on the angle.

In an example, the processor may identify a region index of the one region, based on assigning an index to each of the designated number of regions.

In an example, the processor may output the virtual box, the first heading direction of which is maintained, based on that the angle is less than a designated angle.

In an example, the processor may output the virtual box to which the second heading direction is assigned, based on that the angle is greater than or equal to a designated angle.

In an example, the processor may output the virtual box, the first heading direction of which is maintained, or may output the virtual box to which the second heading direction is assigned, based on the angle and a position of the virtual box.

In an example, the processor may train the neural network model, based on a ground-truth (GT) bounding box and the point cloud.

In an example, the processor may train the neural network model, based on information associated with the virtual box.

In an example, the information associated the virtual box may include at least one of a position of the virtual box, a size of the virtual box, the first heading direction, class information of the virtual box, or score information of the virtual box, or any combination thereof.

In an example, the processor may set the number of anchor boxes among result values output from the neural network model to the designated number to train the neural network model.

In an example, the processor may obtain a loss for at least one of the class information or the position, or any combination thereof, based on training the neural network model.

In an example, the processor may sequentially execute a first algorithm and a second algorithm, based on performing pre-processing for the point cloud, and may train the neural network model, using a result value obtained by sequentially executing the first algorithm and the second algorithm.

According to another example of the present disclosure, a vehicle control method may include identifying, by a processor, a first heading direction of a virtual box generated by a point cloud obtained by light detection and ranging (LiDAR), based on inputting the point cloud to a neural network model, identifying, by the processor, an angle between a reference axis included in one region among a designated number of regions divided on the basis of the center of the virtual box and the first heading direction, based on identifying the first heading direction in the one region, and outputting, by the processor, the virtual box, the first heading direction of which is maintained, or outputting, by the processor, the virtual box to which a second heading direction including a direction opposite to the first heading direction is assigned, based on the angle.

In an example, the vehicle control method may further include identifying a region index of the one region, based on assigning an index to each of the designated number of regions.

The vehicle control method according to example may further include outputting the virtual box, the first heading direction of which is maintained, based on that the angle is less than a designated angle.

The vehicle control method may further include outputting the virtual box to which the second heading direction is assigned, based on that the angle is greater than or equal to a designated angle.

The vehicle control method according to example may further include outputting the virtual box, the first heading direction of which is maintained, or outputting the virtual box to which the second heading direction is assigned, based on the angle and a position of the virtual box.

In an example, the vehicle control method may further include training the neural network model, based on a ground-truth (GT) bounding box and the point cloud.

The vehicle control method according to example may further include training the neural network model, based on information associated with the virtual box. The information associated the virtual box may include at least one of a position of the virtual box, a size of the virtual box, the first heading direction, class information of the virtual box, or score information of the virtual box, or any combination thereof.

The vehicle control method according to example may further include setting the number of anchor boxes among result values output from the neural network model to the designated number to train the neural network model.

The vehicle control method according to example may further include obtaining a loss for at least one of the class information or the position, or any combination thereof, based on training the neural network model.

The vehicle control method according to example may further include sequentially executing a first algorithm and a second operating, based on performing pre-processing for the point cloud, and training the neural network model, using a result value obtained by sequentially executing the first algorithm and the second algorithm.

The present technology may identify a heading direction of a virtual box corresponding to an external object.

Furthermore, the present technology may maintain and output a heading direction of a virtual box generated by a point cloud or may change and output the heading direction of the virtual box.

Furthermore, the present technology may divide a plurality of regions around the virtual box, thus outputting the virtual box, the heading direction of which is maintained, or outputting the virtual box, the heading direction of which is changed.

In addition, various effects ascertained directly or indirectly through the present disclosure may be provided.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure claimed in the following claims.

Therefore, examples of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus for controlling driving of a vehicle, the apparatus comprising:

a sensor configured to obtain a cluster of points;

a memory storing a neural network model; and a processor configured to:

determine, based on inputting the cluster of points to the neural network model, a first heading direction of a virtual box, wherein the virtual box is generated based on the cluster of points;

determine, based on identifying the first heading direction in one region among a designated number of regions, an angle between a reference axis and the first heading direction, wherein the reference axis is included in the one region, and wherein the designated number of regions are divided based on a center of the virtual box;

based on the determined angle:

output the virtual box assigned with the first heading direction, wherein the first heading direction is maintained, or output the virtual box assigned with a second heading direction that is opposite to the first heading direction; and output a signal associated with:

the virtual box assigned with the first heading direction, or the virtual box assigned with the second heading direction; and control, based on the signal, driving of the vehicle.

2. The apparatus of claim 1, wherein the processor is configured to:

determine, based on assigning an index to each of the designated number of regions, a region index of the one region.

3. The apparatus of claim 1, wherein the processor is configured to:

output, based on the determined angle being less than a threshold angle, the virtual box assigned with the first heading direction.

4. The apparatus of claim 1, wherein the processor is configured to:

output, based on the determined angle being greater than or equal to a threshold angle, the virtual box assigned with the second heading direction.

5. The apparatus of claim 1, wherein the processor is configured to:

output, based on the determined angle and a position of the virtual box, the virtual box assigned with the first heading direction or the virtual box assigned with the second heading direction.

6. The apparatus of claim 1, wherein the processor is configured to:

train, based on a ground-truth (GT) bounding box and the cluster of points, the neural network model.

7. The apparatus of claim 6, wherein the processor is configured to:

train, based on information associated with the virtual box, the neural network model, and wherein the information associated the virtual box comprises at least one of:

a position of the virtual box, a size of the virtual box, the first heading direction, class information of the virtual box, or score information of the virtual box.

8. The apparatus of claim 7, wherein the processor is configured to:

set a number of anchor boxes among result values output from the neural network model to a designated number to train the neural network model.

9. The apparatus of claim 7, wherein the processor is configured to:

obtain, based on training the neural network model, a loss value for at least one of the class information or the position.

10. The apparatus of claim 6, wherein the processor is configured to:

sequentially execute, based on performing pre-processing for the cluster of points, a first algorithm and a second algorithm; and train, based on a result value obtained by sequentially executing the first algorithm and the second algorithm, the neural network model.

11. A method performed by an apparatus for controlling driving of a vehicle, the method comprising:

determining, based on inputting a cluster of points to a neural network model, a first heading direction of a virtual box, wherein the virtual box is generated based on the cluster of points, and wherein the cluster of points are obtained by a sensor;

determining, based on identifying the first heading direction in one region among a designated number of regions, an angle between a reference axis and the first heading direction, wherein the reference axis is included in the one region, and wherein the designated number of regions are divided based on a center of the virtual box;

based on the determined angle:

outputting the virtual box assigned with the first heading direction, wherein the first heading direction is maintained, or outputting the virtual box assigned with a second heading direction that is opposite to the first heading direction;

outputting a signal associated with:

the virtual box assigned with the first heading direction, or the virtual box assigned with the second heading direction; and controlling, based on the signal, driving of the vehicle.

12. The method of claim 11, further comprising:

determining, based on assigning an index to each of the designated number of regions, a region index of the one region.

13. The method of claim 11, wherein the outputting the virtual box comprises outputting, based on the determined angle being less than a threshold angle, the virtual box assigned with the first heading direction.

14. The method of claim 11, wherein the outputting the virtual box comprises outputting, based on the determined angle being greater than or equal to a threshold angle, the virtual box assigned with the second heading direction.

15. The method of claim 11, wherein the outputting the virtual box comprises outputting, based on the determined angle and a position of the virtual box, the virtual box assigned with the first heading direction or the virtual box assigned with the second heading direction.

16. The method of claim 11, further comprising:

training, based on a ground-truth (GT) bounding box and the cluster of points, the neural network model.

17. The method of claim 16, further comprising:

training, based on information associated with the virtual box, the neural network model, wherein the information associated the virtual box comprises at least one of:

a position of the virtual box, a size of the virtual box, the first heading direction, class information of the virtual box, or score information of the virtual box.

18. The method of claim 17, further comprising:

setting a number of anchor boxes among result values output from the neural network model to a designated number to train the neural network model.

19. The method of claim 17, further comprising:

obtaining, based on training the neural network model, a loss value for at least one of the class information or the position.

20. The method of claim 16, further comprising:

sequentially executing, based on performing pre-processing for the cluster of points, a first algorithm and a second algorithm; and training, based on a result value obtained by sequentially executing the first algorithm and the second algorithm, the neural network model.

* * * * *